United States Patent
Assem Aly Salama et al.

(10) Patent No.: US 9,332,224 B2
(45) Date of Patent: May 3, 2016

(54) ADAPTIVE VIDEO STREAMING FOR COMMUNICATION SESSIONS

(71) Applicant: International Business Machines Corporation, Armonk, NY (US)

(72) Inventors: Hitham Ahmed Assem Aly Salama, Blanchardstown (IE); Jonathan Dunne, Dungarvan (IE); James P. Galvin, Jr., Georgetown, KY (US); Patrick J. O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 14/290,213

(22) Filed: May 29, 2014

(65) Prior Publication Data
US 2015/0350602 A1 Dec. 3, 2015

(51) Int. Cl.
*H04N 7/15* (2006.01)
*H04N 7/14* (2006.01)

(52) U.S. Cl.
CPC .............. *H04N 7/152* (2013.01); *H04N 7/147* (2013.01); *H04N 7/157* (2013.01)

(58) Field of Classification Search
CPC ........... H04N 7/14; H04N 7/15; H04N 7/152; H04N 7/148; H04N 21/2343; H04N 21/2402; H04N 21/4788; H04N 21/2405; H04L 65/80; H04L 65/602; H04L 65/607
USPC ............ 348/14.01–14.16; 709/233, 234, 235, 709/204
See application file for complete search history.

(56) References Cited

U.S. PATENT DOCUMENTS

| 6,590,604 B1 | 7/2003 | Tucker et al. |
| 6,989,856 B2 | 1/2006 | Firestone et al. |

(Continued)

FOREIGN PATENT DOCUMENTS

| EP | 1737235 A2 | 12/2006 |
| WO | 0178394 A1 | 10/2001 |

(Continued)

OTHER PUBLICATIONS

U.S. Appl. No. 14/965,950, filed Dec. 4, 2014, Not Attached, Not Yet Published for Examiner's Eyes Only;.

(Continued)

*Primary Examiner* — Melur Ramakrishnaiah
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for managing quality of experience for video conferences. In an implementation, a method may include determining a capacity of a participant associated with a video conference. The method may also include determining a number of remote participants of the video conference. The method may further include implementing a video distribution architecture for the participant based upon, at least in part, the capacity of the participant and the number of remote participants. Implementing the video distribution architecture for the participant may include implementing a distributed architecture session for the participant if the capacity of the participant is greater than or equal to the number of remote participants of the video conference. Implementing the video distribution architecture for the participant may also include implementing a centralized architecture session for the participant if the capacity of the participant is less than the number of remote participants of the video conference.

11 Claims, 8 Drawing Sheets

(56) References Cited

U.S. PATENT DOCUMENTS

| | | | |
|---|---|---|---|
| 8,312,164 B2* | 11/2012 | Vass | 709/233 |
| 2012/0050458 A1 | 3/2012 | Mauchly et al. | |
| 2012/0297405 A1 | 11/2012 | Zhang et al. | |
| 2014/0095604 A1* | 4/2014 | Bank et al. | 709/204 |
| 2014/0241215 A1* | 8/2014 | Massover et al. | 370/260 |
| 2015/0304502 A1 | 10/2015 | Pilli et al. | |
| 2015/0350603 A1 | 12/2015 | Assem Aly Salama et al. | |

FOREIGN PATENT DOCUMENTS

| | | |
|---|---|---|
| WO | 2008082375 A2 | 7/2008 |
| WO | 2012112139 A1 | 8/2012 |

OTHER PUBLICATIONS

U.S. Appl. No. 14/622,045, (U.S. Publication No. 2015-0350603), Filed Feb. 13, 2015, Not Attached for Examiner's Eyes Only.

U.S. Appl. No. 14/460,019, filed Dec. 4, 2014, Not Attached, Not Yet Published for Examiner's Eyes Only;.

U.S. Appl. No. 14/965,950, filed Dec. 11, 2015, Not Attached, Not Yet Published, for Examiner's Eyes Only.

* cited by examiner

ADAPTIVE VIDEO STREAMING FOR COMMUNICATION SESSIONS

TECHNICAL FIELD

The present disclosure generally relates to systems and method for electronic communications, and more particularly relates to managing quality of experience for electronic communication sessions.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

SUMMARY OF DISCLOSURE

According to an implementation, a computer-implemented method may include determining, by a processor, a capacity of a participant associated with a video conference. The method may also include determining a number of remote participants of the video conference. The method may further include implementing a video distribution architecture for the participant based upon, at least in part, the capacity of the participant and the number of remote participants. Implementing the video distribution architecture for the participant may include implementing a distributed architecture session for the participant if the capacity of the participant is greater than or equal to the number of remote participants of the video conference. Implementing the video distribution architecture for the participant may also include implementing a centralized architecture session for the participant if the capacity of the participant is less than the number of remote participants of the video conference.

One or more of the following features may be included. Determining the capacity of the participant may be in response to identifying a change in network conditions associated with the participant. Implementing the video distribution architecture for the participant may be in response to the participant joining the video conference.

Implementing the video distribution architecture for the participant may be in response to a change in the number of remote participants of the video conference. Implementing the video distribution architecture for the participant may include changing the video distribution architecture for the participant. The change in the number of remote participants may include an additional remote participant joining the video conference. The change in the number of remote participants may include one of the remote participants leaving the video conference.

According to another implementation, a computer program product may include a computer readable storage medium having a plurality of instructions stored on it. When executed by a processor, the instructions may cause the processor to perform operations including determining a capacity of a participant associated with a video conference. Instructions may also be included for determining a number of remote participants of the video conference. Instructions may further be included for implementing a video distribution architecture for the participant based upon, at least in part, the capacity of the participant and the number of remote participants. Implementing the video distribution architecture for the participant may include implementing a distributed architecture session for the participant if the capacity of the participant is greater than or equal to the number of remote participants of the video conference. Implementing the video distribution architecture for the participant may also include implementing a centralized architecture session for the participant if the capacity of the participant is less than the number of remote participants of the video conference.

One or more of the following features may be included. Determining the capacity of the participant may be in response to identifying a change in network conditions associated with the participant. Implementing the video distribution architecture for the participant may be in response to the participant joining the video conference.

Implementing the video distribution architecture for the participant may be in response to a change in the number of remote participants of the video conference. Implementing the video distribution architecture for the participant may include changing the video distribution architecture for the participant. The change in the number of remote participants may include an additional remote participant joining the video conference. The change in the number of remote participants may include one of the remote participants leaving the video conference.

According to another implementation, a computing system may include a processor and a memory module coupled with the processor. The processor may be configured for determining a capacity of a participant associated with a video conference. The processor may also be configured for determining a number of remote participants of the video conference. The processor may further be configured for implementing a video distribution architecture for the participant based upon, at least in part, the capacity of the participant and the number of remote participants. Implementing the video distribution architecture for the participant may include implementing a distributed architecture session for the participant if the capacity of the participant is greater than or equal to the number of remote participants of the video conference. Implementing the video distribution architecture for the participant may also include implementing a centralized architecture session for the participant if the capacity of the participant is less than the number of remote participants of the video conference.

One or more of the following features may be included. Determining the capacity of the participant may be in response to identifying a change in network conditions associated with the participant. Implementing the video distribution architecture for the participant may be in response to the participant joining the video conference.

Implementing the video distribution architecture for the participant may be in response to a change in the number of remote participants of the video conference. The change in the number of remote participants may include an additional remote participant joining the video conference. The change in the number of remote participants may include one of the remote participants leaving the video conference.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
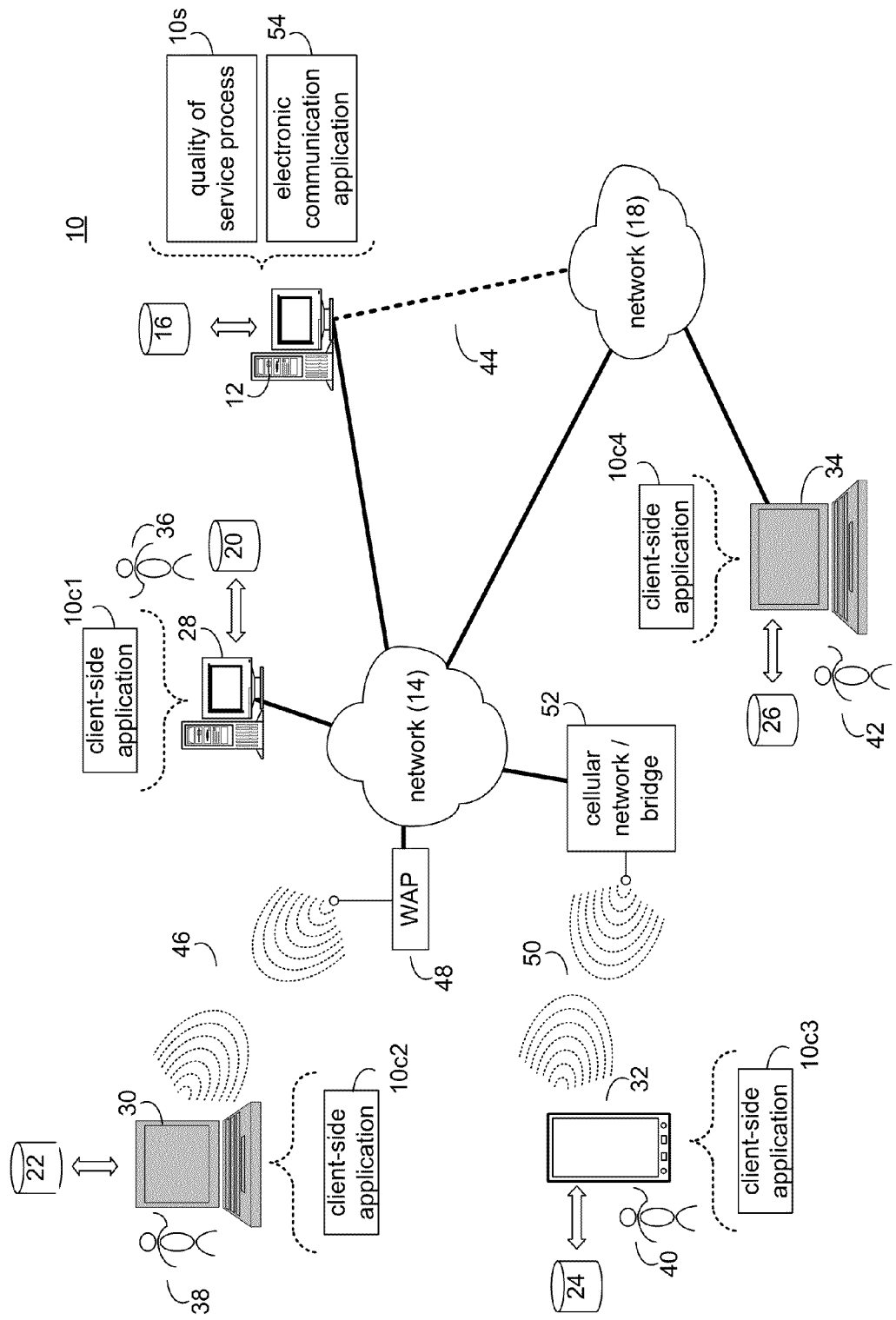
FIG. 1 is a diagrammatic view of a distributed computing network including a computing device that executes a quality of experience process according to an implementation of the present disclosure.

Individuals may often engage in communication sessions, or video conferences, utilizing a data network for conveying the communications. Such communication sessions, or video conferences, may include, multimedia conferences and Video-over-IP communications, in which the communications to and from each party may be conveyed as packetized data over a data network. The quality of these types of communications can be greatly affected by network conditions. For example, available bandwidth, delay, packet loss, jitter, burst ratio may be important factors that may impact the perceived quality of experience of the individuals participating in a video conference. For example, in a multimedia conference, or other video conference including a video component, the quality of the video can often be one of the more significant factors in a user's perceived quality of experience. Consistent with an embodiment of the present disclosure, adaptive selection of video distribution architectures may be utilized to provide effective video stream distribution among the participants of a video conference including a video component. The adaptive selection of video distribution architectures may provide satisfactory quality of experience for the participants of the video conference, and/or a quality of experience that is optimized for given network conditions and number of video conference participants.

In some embodiments, a video distribution architecture may be adaptively selected. The video distribution architecture may include a centralized video distribution architecture in which a participant may stream video transmissions to a focus (for example, a middleware unit such Multi Control Unit (MCU), a designated participant such as a meeting moderator, or another computing device). The focus may receive the video transmission from the participant and distribute the video transmissions to the other individuals participating in the video conference. In a situation in which multiple participants of the video conference may be utilizing a centralized video distribution architecture, the focus may, in some embodiments, mix the video stream from the multiple participants and make the necessary transcoding or trans-ratings prior to distributing the video stream to the individuals participating in the video conference. The video distribution architecture may also include a distributed video distribution architecture. In general, in a distributed distribution architecture, a participant in the video conference may transmit a video stream to each other participant in the video conference. In some embodiments the distributed architecture may include an Application Level Multicast, e.g., that may form an application layer multicast tree to distribute the video stream to the other participants in the video conference. In some such embodiments, each computing device utilized by a user to participate in the video conference may receive a video stream from one or more of the other participants, and may have full control over whether or not a given video stream is to be received. In some embodiments, a distributed video distribution architecture may provide a higher quality of experience for the participants of a video conference. A distributed video distribution architecture may require a greater bandwidth capacity than may be available to some participants in the video conference. In some embodiments, participants who do not have a sufficient bandwidth capacity to implement a distributed architecture session may utilized a centralized video distribution architecture.

In some embodiments, a video distribution architecture for a given participant of a video conference may be adaptively selected based upon, at least in part, an available capacity of the participant to transmit a video stream to each of the other participants of the video conference. For example, an available bandwidth capacity may be determined for the participant, and the number of other, or remote, participants of the video conference may be determined. If the participant has an available capacity to transmit a separate video stream to each of the other participants of the video conference, a distributed architecture session may be implemented, in which the participant may utilized a distributed video distribution architecture for participating in the video conference. If the participant does not have a sufficient available capacity to transmit a separate video stream to each of the other participants of the video conference, a centralized architecture session may be implemented for the participant, in which the participant may transmit a single video stream to a focus, which may then distribute the video stream from the participant to the other participants of the video conference. In some embodiments in which multiple participants may utilized a centralized architecture, the focus may mix the video streams received from each participant utilizing a centralized architecture, and the focus may transmit the mixed video stream to the participants of the video conference.

In some embodiments, the selection of the video distribution architecture may be adaptive. For example, the video distribution architecture utilized by a participant may change during the course of the video conference. For example, during the course of the video conference the available capacity of a first participant may change, thereby increasing or decreasing the number of other participants to which the first participant may directly transmit a video stream for the video conference. In some embodiments, the number of participants in the video conference may change during the course of the video conference, e.g., as a result of participants leaving the video conference and/or new participants joining the video conference. As generally described above, if the available capacity of the first participant is equal to, or greater than, the number of remote users, a distributed architecture session may be implemented. Further, if the available capacity of the first participant is less than the number of remote users, a centralized architecture session may be implemented. Accordingly, in some embodiments, as the capacity of the first participant changes, and/or as the number of remote participants changes, the video distribution architecture utilized by the first user may adaptively change to provide a desirable quality of experience for the first participant.

In some embodiments, the video distribution architecture utilized for a video conference may differ among the participants of the video conference. For example, some participants of the video conference may have a sufficient capacity, relative to the number of remote participants in the video conference, to support a distributed architecture session. Other participants in the video conference may not have a sufficient capacity, relative to the number of remote participants in the video conference, to support a distributed architecture session. In some embodiments, participants having a sufficient capacity may implement a distributed architecture session, and participants not having a sufficient capacity to implement a distributed architecture session may implement a centralized architecture session. As generally discussed above, the video distribution architecture implemented by each participant may change over the course of the video conference, e.g., based upon, at least in part, a change in an individual participants capacity, and/or a change in the number of remote participants in the video conference.

Referring to FIG. 1, there is shown quality of experience process 10. For the following discussion, it is intended to be understood that quality of experience process 10 may be implemented in a variety of ways. For example, quality of experience process 10 may be implemented as a server-side process, a client-side process, or a server-side/client-side process.

For example, quality of experience process 10 may be implemented as a purely server-side process via quality of experience process 10s. Alternatively, quality of experience process 10 may be implemented as a purely client-side process via one or more of client-side application 10c1, client-side application 10c2, client-side application 10c3, and client-side application 10c4. Alternatively still, quality of experience process 10 may be implemented as a server-side/client-side process via server-side quality of experience process 10s in combination with one or more of client-side application 10c1, client-side application 10c2, client-side application 10c3, and client-side application 10c4. In such an example, at least a portion of the functionality of quality of experience process 10 may be performed by quality of experience process 10s and at least a portion of the functionality of quality of experience process 10 may be performed by one or more of client-side application 10c1, 10c2, 10c3, and 10c3.

Accordingly, quality of experience process 10 as used in this disclosure may include any combination of quality of experience process 10s, client-side application 10c1, client-side application 10c2, client-side application 10c3, and client-side application 10c4.

Figure 2:
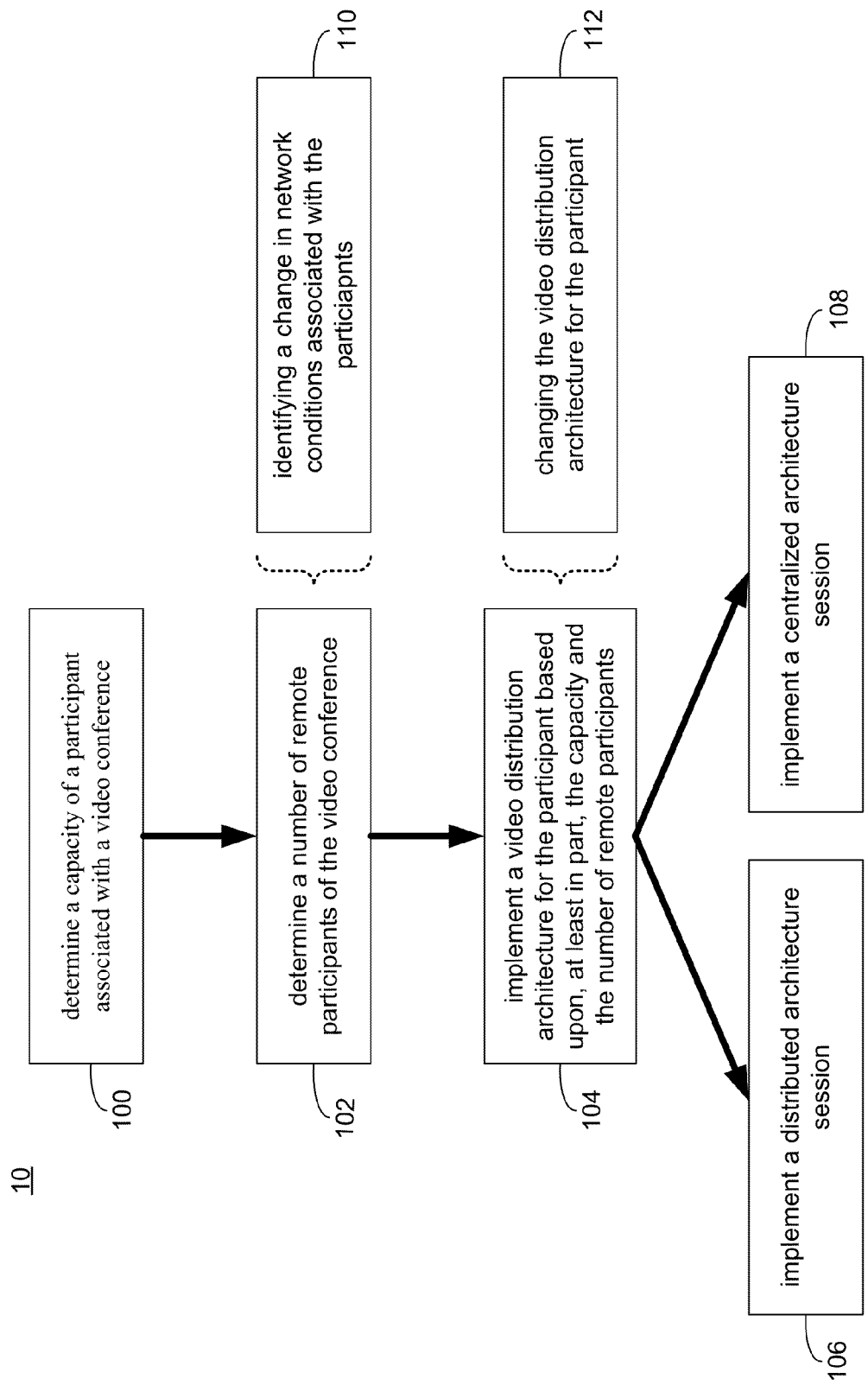
FIG. 2 is a flowchart of the quality of experience process of FIG. 1, according to an implementation of the present disclosure.

Referring also to FIG. 2, and as will be discussed in greater detail below, quality of experience process 10 may determine 100 a capacity of a participant associated with a video conference. Quality of experience process 10 may also determine 102 a number of remote participants of the video conference. Quality of experience process 10 may further include implement 104 a video distribution architecture for the participant based upon, at least in part, the capacity of the participant and the number of remote participants. Implementing 104 the video distribution architecture for the participant may include implementing 106 a distributed architecture session for the participant if the capacity of the participant is greater than or equal to the number of remote participants of the video conference. Implementing 104 the video distribution architecture for the participant may also include implementing 108 a centralized architecture session for the participant if the capacity of the participant is less than the number of remote participants of the video conference.

Quality of experience process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of experience process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a voice-over-IP application, a video-over-IP application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access quality of experience process 10 directly through network 14 or through secondary network 18. Further, quality of experience process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, quality of experience process 10 may communicate with, interact with, and/or include a component or module of a communication application (e.g., communication application 54). As is generally known, a communication application (e.g., communication application 54) may generally facilitate multi-media communications, such as video communications or conferences, between individuals as participants in a video conference. For example, communication application 54 may facilitate voice over IP and/or video over IP communications between video conference participants. In some embodiments, a video conference may only include two participants. In some embodiments, a video conference may include more than two participants. In some embodiments, communication application 54 may include, and/or may interact with, for example, an electronic meeting application, a web conferencing application, or a similar application. An example of communication application 54 may include, but is not limited to, Lotus® Sametime®. (Lotus and Sametime are registered trademarks of International Business Machine Corporation in the United States, other countries, or both). In some embodiments, communication application 54 may include a communication gateway and/or provide functionality of a communication gateway.

In an embodiment, the instruction sets and subroutines of electronic communication application 54 may be stored, e.g., on storage device 16 associated with server computer 12, which executes electronic communication application 54, and/or another suitable storage device. Further, users (e.g., one or more of users 36, 38, 40, 42) may access electronic communication application 54 in order to participate in an electronic video conference (such as a video call, an electronic meeting, or other video conference type). The users may access electronic communication application 54 via one or more suitable applications, such as client side applications 10c1-10c4 (e.g., which may include a video-over-IP application, a web browser, a client electronic meeting application, or another application) and/or via a different application (not shown). Additionally, while some users are depicted as being connected with server computer 12 (and therefore with electronic communication application 54) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of quality of experience process 10 may be provided by one or more of client side applications 10c1-10c4. For example, in some embodiments quality of experience process 10 (and/or client-side functionality of quality of experience process 10) may be included within and/or interactive with client-side applications 10c1-10c4, which may include client side electronic communication applications, web browsers, or another application. Various additional/alternative configurations may be equally utilized.

As generally discussed above with reference to FIG. 2, quality of experience process 10 may determine 100 a capacity of a participant associated with a video conference. Quality of experience process 10 may also determine 102 a number of remote participants of the video conference. Quality of experience process 10 may further include implement 104 a video distribution architecture for the participant based upon, at least in part, the capacity of the participant and the number of remote participants. Implementing 104 the video distribution architecture for the participant may include implementing 106 a distributed architecture session for the participant if the capacity of the participant is greater than or equal to the number of remote participants of the video conference. Implementing 104 the video distribution architecture for the participant may also include implementing 108 a centralized architecture session for the participant if the capacity of the participant is less than the number of remote participants of the video conference.

Figure 3:
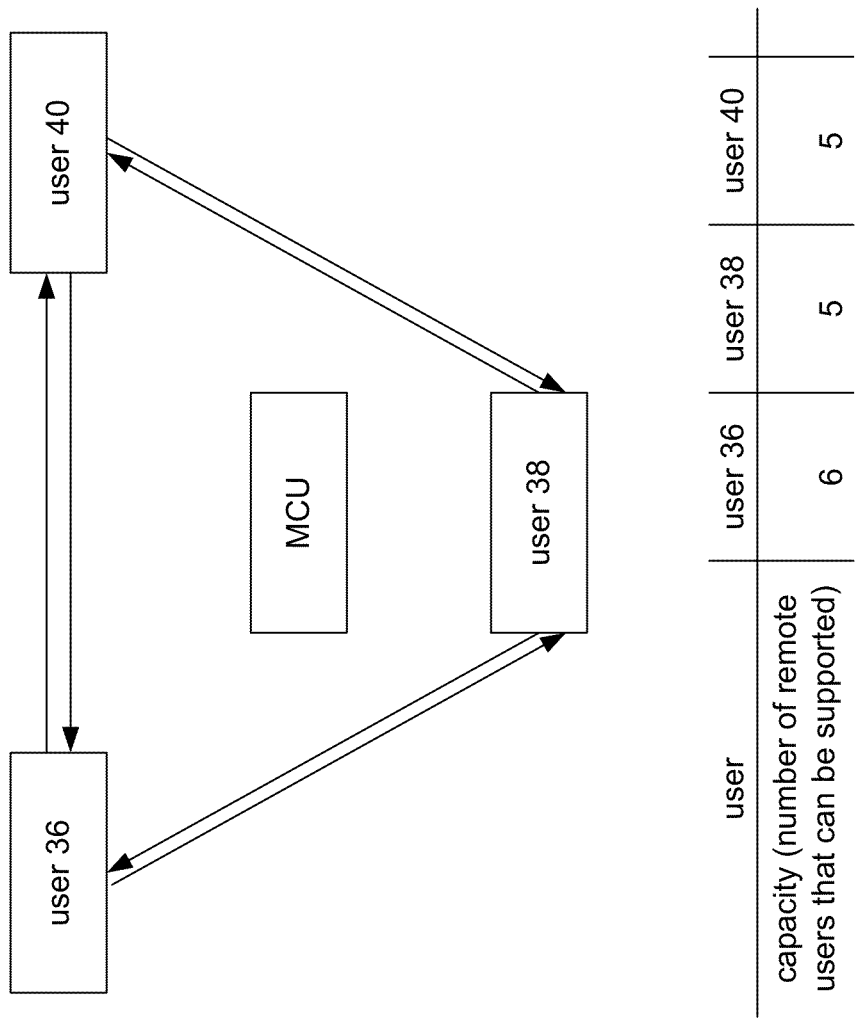
FIG. 3 diagrammatically depicts an video distribution architecture arrangement provided by the quality of experience process of FIG. 1, according to an example embodiment.

For example, and referring also to FIG. 3, a video conference, such as a multimedia conference, video conference, etc., may include several participants (e.g., user 36, user 38, and user 40 in the illustrated example). Quality of experience process 10 may determine 100 a capacity of a participant associated with a video conference. For example, quality of experience process 10 may determine 100 the capacity of each of user 36, user 38, and user 40 who may participate in the example video conference. Quality of experience process 10 may determine 100 the capacity of all of the participants of the video conference, and/or of any one or more participants in the video conference. In general, the capacity of the participant may include the number of independent video bit streams the participant is capable of transmitting for the video conference at generally the same time. Generally, the capacity of the participant may include the available uplink bandwidth for the participant divided by the bandwidth requirement for an individual video bit stream for the video conference. The available uplink bandwidth for the participant may include the available uplink bandwidth associated with the computing device utilized by the participant for engaging the video conference (e.g., computing device 28 utilized by user 36, computing device 30 utilized by user 38, and computing device 32 utilized by user 40).

As shown in the example of FIG. 3, from a practical perspective, the capacity of a participant may be determined 100 as the number of remote users that can be supported/engaged by the participant using a distributed video distribution architecture (e.g., a "distributed architecture"). In general, a remote user, or remote participant of the video conference, may include an individual participating in the video conference using a different computing device than the participant whose capacity is being determined 100. For example, relative to user 36, the example video conference of FIG. 3 may include two remote participants, namely user 38 and user 40. Consistent with the illustrated example, quality of experience process 10 may determine that user 36 may have the capacity to support six remote users (e.g., to provide six independent video bit streams for the video conference). Similarly, quality of experience process 10 may determine that user 38 and user 40 are each have a capacity to support five remote users.

In an embodiment, quality of experience process 10 may determine 100 a capacity associated with each participant of the video conference when each respective participant joins the video conference (and/or transmits a request to join the communication, accepts and invitation to join the video conference, or the like). In some situations, the uplink bandwidth available to a user (e.g., available via a computing device utilized by the user and/or of a network connection associated with the computing device) may vary over time. For example, in the illustrated embodiment users 38 and 40 may utilized (via computing devices 30, 32) wireless communication channels 46 and 50 respectively. The uplink bandwidth capacity available to users 38 and 40 may vary depending upon network conditions, such as the number of users accessing WAP 48 and cellular network bridge 52, interference to the wireless signal, distance between users 38 and 40 and WAP 48 and cellular network bridge 52, etc. Available bandwidth capacity may similarly vary for wired network connections. Accordingly, in some embodiments, in addition/as an alternative to determining 100 a capacity associated with a participant when the participant joins the video conference, determining 100 the capacity of the participant may be in response to identifying 110 a change in network conditions associated with the participant. In response to identifying 110 a change in network conditions associated with the participant (e.g., relative to network conditions at the time the participant joined the video conference, etc.), quality of experience process 10 may determine 100 the capacity associated with the participant.

Quality of experience process 10 may also determine 102 a number of remote participants of the video conference. With continued reference to FIG. 3, in the illustrated example, the video conference may include three participants (and/or three groups of participants) engaging in the video conference via three separate computing devices. As generally described above, in the example video conference, each participant may engage in the video conference with two remote participants. For example, user 38 and user 40 may be remote participants relative to user 36. Similarly, user 36 and user 40 may be remote participants relative to user 38. Additionally, user 36 and user 38 may be remote participants relative to user 40. As generally described, a plurality of users engaged in the video conference using a single computing device may be considered a single remote participant by quality of experience process.

Quality of experience process 10 may further include implement 104 a video distribution architecture for the participant based upon, at least in part, the capacity of the participant and the number of remote participants. A video distribution architecture may include, for example, one of a centralized video distribution architecture (e.g., a "centralized architecture") and a distributed video distribution architecture (e.g., a "distributed architecture"). In general, a centralized video distribution architecture may utilized a central a focus (for example, a middleware unit such as a Multi Control Unit (e.g., MCU shown in FIG. 3), a designated participant such as a meeting moderator, or another computing device). A participant may transmit a video bit stream for the video conference to the focus. The focus may receive the video transmission from the participant and distribute the video transmissions to the other individuals participating in the video conference. In a situation in which multiple participants of the video conference may be utilizing a centralized video distribution architecture, the focus may, in some embodiments, mix the video stream from the multiple participants and make the necessary transcoding or trans-ratings prior to distributing the video stream to the individuals participating in the video conference. The video distribution architecture may also include a distributed video distribution architecture. In general, in a distributed distribution architecture, a participant in the video conference may transmit a video stream to each other participant in the video conference. In some embodiments the distributed architecture may include an Application Level Multicast, e.g., that may form an application layer multicast tree to distribute the video stream to the other participants in the video conference. In some such embodiments, each computing device utilized by a user to participate in the video conference may receive a video stream from one or more of the other participants, and may have full control over whether or not a given video stream is to be received.

In some situations, a centralized architecture may result in a lower load placed on individual participants (e.g., lower bandwidth requirement) in the video conference, e.g., as a result of sending a single video bit stream to the focus. In some embodiments, a centralized architecture may result in relatively higher overhead delays and packet loss, e.g., due to the presence of a single point of failure and bottleneck for the video stream traffic of the video conference (e.g., which may be received by the focus and then distributed from the focus to the various participants of the video conference). Additionally, in some embodiments a centralized architecture may result in relatively lower video quality. A distributed video distribution architecture may require a relatively greater bandwidth capacity as a result of the need to transmit a separate video bit stream to each other participant in the video conference. In some embodiments, transmitting a separate video bit stream to each other participant in the video conference may place a higher load on the network utilized in connection with a video conference, but may result in relatively lower delays and packet loss, and may provide relatively higher video quality.

Implementing 104 the video distribution architecture for the participant may include implementing 106 a distributed architecture session for the participant if the capacity of the participant is greater than or equal to the number of remote participants of the video conference. Continuing with the illustrated example of FIG. 3, each of the participants (e.g., user 36, user 38, and user 40) may have a capacity greater than the number of remote users. For example, user 36 may have a capacity to support six remote participants, and users 38 and 40 may each have a capacity to support five remote users, while the example video conference may only include two remote participants, or users, relative to each participant. As such, each participant may have a capacity that is greater than or equal to the number of remote participants in the video conference. In the illustrated example, quality of experience process 10 may implement 106 a distributed architecture session (e.g., may implement 104 the video conference utilizing a distributed video distribution architecture) for each of the participants in the video conference. As generally shown, consistent with the implemented 106 distributed architecture session, user 36 may transmit a video stream directly to each of user 38 and user 40. Similarly, user 38 may transmit a video stream directly to each of user 36 and user 40. Further, user 40 may transmit a video stream directly to each user 36 and user 38. It will be appreciated that discussion of capacity, transmission and/or reception of video streams and the like by users, or participants in the video conference, is intended to attribute such characteristics or actions as being associated with, and/or performed by, computing devices utilized by the users, or participants, for the purpose of engaging the video conference, whether or not such attribution is directly indicated.

Figure 4:
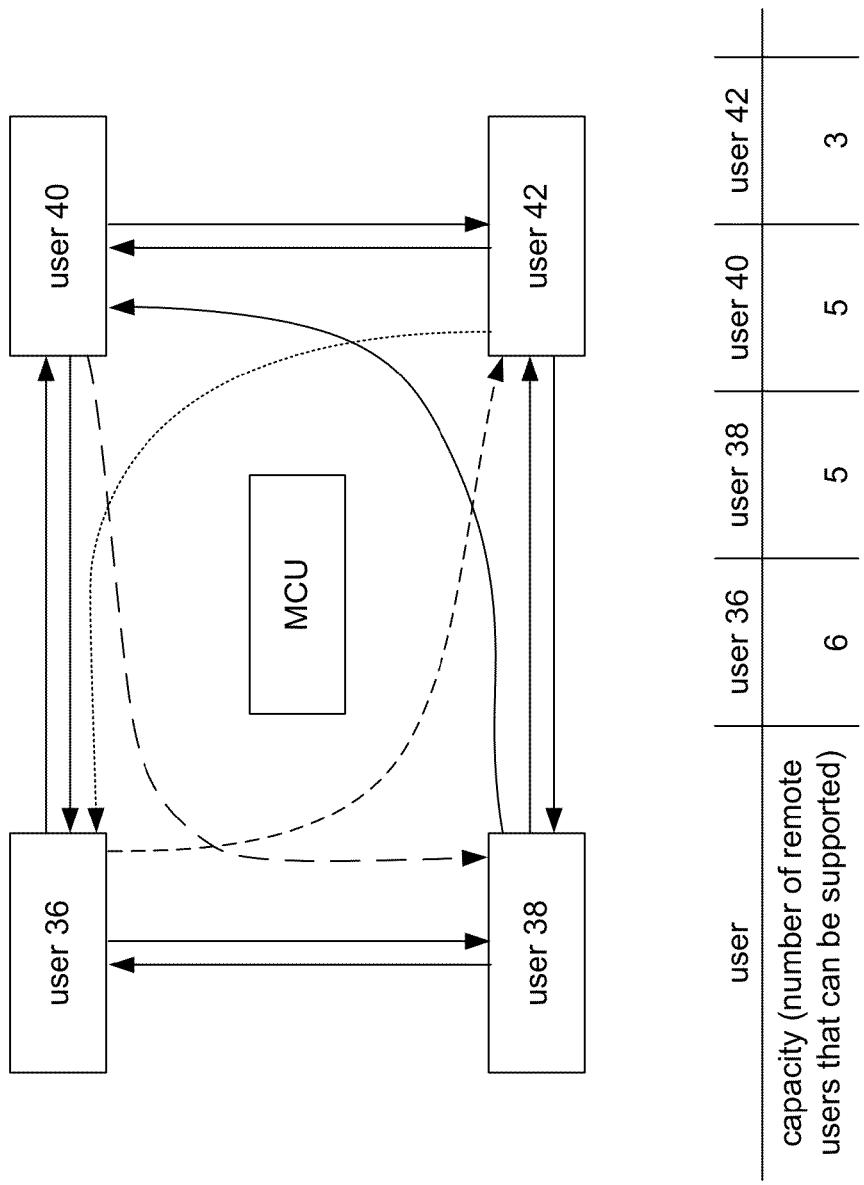
FIG. 4 diagrammatically depicts an video distribution architecture arrangement provided by the quality of experience process of FIG. 1, according to an example embodiment.

Implementing 104 the video distribution architecture for the participant may be in response to the participant joining the video conference. For example, and referring also to FIG. 4, an additional participant (e.g., user 42) may join (and/or request to join) the video conference (e.g., after the video conference is ongoing, after users 36, 38, 40 have joined or requested to join the video conference, or the like). In an embodiment, quality of experience process 10 may determine 100 a capacity for user 42, who may be joining the video conference. Consistent with the illustrated example, quality of experience process 10 may determine 100 that user 42 may have a capacity to support three remote users. Further, quality of experience process 10 may determine the number of remote users relative to user 42, who may be joining the video conference. In the illustrated example of FIG. 4, the video conference may include three remote participants relative to user 42. In the illustrated example, user 42 may have a capacity that is greater than or equal to the number of remote participants of the video conference. As such, quality of experience process 10 may implement 104 a video distribution architecture for user 42, including implementing 106 a distributed architecture session. For example, quality of experience process 10 may transmit instructions to user 42 (e.g., to computing device 34 utilized by user 42 for participating in the video conference) to implement 106 a distributed architecture session for participating in the video conference. Consistent with the implemented 106 distributed architecture session, user 42 (e.g., computing device 34 utilized by user 42 for participating in the video conference) may transmit a video bit stream to each of users 36, 38, and 40 for the video conference.

In the illustrated example, each of users 36, 38, and 40 may have a capacity that is greater than or equal to the number of remote participants of the video conference. As such, each of users 36, 38, and 40 may continue to operate in the previously implemented distributed architecture session. Following user 42 joining the video conference, each of users 36, 38, and 40 may additionally transmit a respective video bit stream to user 42 for the video conference. Additionally, and as will generally be described below, quality of experience process 10 may determine 100 (and/or re-determine) a capacity associated with each participant in the video conference and may determine 102 a number of remote participants relative to each participant of the video conference. As will also be described in greater detail below, quality of experience process 10 may adaptively implement 104 a video distribution architecture for each participant based upon, at least in part, the determined 100 capacity and determined 102 remote participants relative to each participant of the video conference.

Implementing 104 the video distribution architecture for the participant may be in response to a change in the number of remote participants of the video conference. For example, during the course of the video conference the number of participant in the video conference may change as a result of new participants joining the video conference and/or participants leaving the video conference. Quality of experience process 10 may adaptively implement 104 the video distribution architecture for a participant of the video conference to provide a satisfactory and/or optimized quality of experience for the participant.

In an embodiment, the change in the number of remote participants may include an additional remote participant joining the video conference. As generally described above, a participant of the video conference may implement 106 a distributed architecture session if the participant has a capacity that is greater than or equal to the number of remote participants of the video conference. That is, participants of the video conference must have a sufficient capacity to absorb the additional participant, for example, by having the capacity to support the augmented (by the addition of a new participant) number of remote participants of the video conference. For example, and referring to FIG. 5, at some time after user 42 has joined (and/or requested to join) the video conference, another participant (e.g., user A) may joint, or request to join, the video conference. Quality of experience process 10 may implement 104 the video distribution architecture for user 42 based upon, at least in part, the capacity of user 42 and the number of remote participants of the video conference, which may be increased by user A joining the video conference. In an embodiment, quality of experience process 10 may implement 104 the video distribution architecture based upon, at least in part, a previously determined capacity of user 42 (e.g., a capacity to support three remote participants). In some embodiments, in response to a change in the number or participants of the video conference quality of experience process 10 may determine 100 (e.g., which may include re-determining) a capacity for user 42. Determining 100 a capacity for user 42 may, for example, account for any changes in network conditions associated with user 42.

As generally discussed above, quality of experience process 10 may adaptively select a video distribution architecture that may provide a satisfactory and/or an optimum quality of experience for the participants of the video conference. In an embodiment, implementing 104 the video distribution architecture for the participant may include changing 112 the video distribution architecture for the participant. For example, and with continued reference to FIG. 5, assume that the capacity associated with user 42 remains a capacity to support three remote participants. With the addition of user A, the video conference now includes four remote participants, which is greater than the capacity of user 42. Attempting to maintain a distributed architecture session for user 42, who may have an insufficient capacity to support the number of remote participants of the video conference, may result in a relatively large delay and/or number of lost packets, which may render the video stream provided by user 42 to the other participants of the video conference unsatisfactory.

In an embodiment, and consistent with the adaptive selection of a video distribution architecture provided by quality of experience process 10, quality of experience process 10 may change 112 the video distribution architecture for user 42. For example, as described with respect to the example of FIG. 4, user 42 may have previously utilized a distributed architecture session. Based upon, at least in part, the addition of user A to the video conference, the number of remote participants of the video conference (e.g., four remote participants) may be greater than user 42's capacity (e.g., a capacity to support three remote participants). Quality of experience process 10 may change 112 the video distribution architecture for user 42 to implement 108 a centralized architecture session for user 42 based upon, at least in part, the capacity of user 42 being less than the number of remote participants of the video conference. Consistent with the implemented 108 centralized architecture session, user 42 may transmit a video stream to the MCU. As shown in bold arrows, the video stream transmitted to the MCU by user 42 may be distributed to the remote participants of the video conference by the MCU. In addition to distributing the video stream from user 42 to the other participants of the video conference, the MCU may mix the video stream from user 42 with any other video streams received by the MCU for the video conference. As such, the video stream distributed by the MCU may include the mixed video stream. As generally discussed above, the centralized architecture may reduce the bandwidth requirement for user 42, e.g., by virtue of only requiring that a single video stream be transmitted to the MCU. In some embodiments, the use of the centralized architecture for the video stream from user 42 may reduce the quality of experience associated with the video component from user 42.

Figure 5:
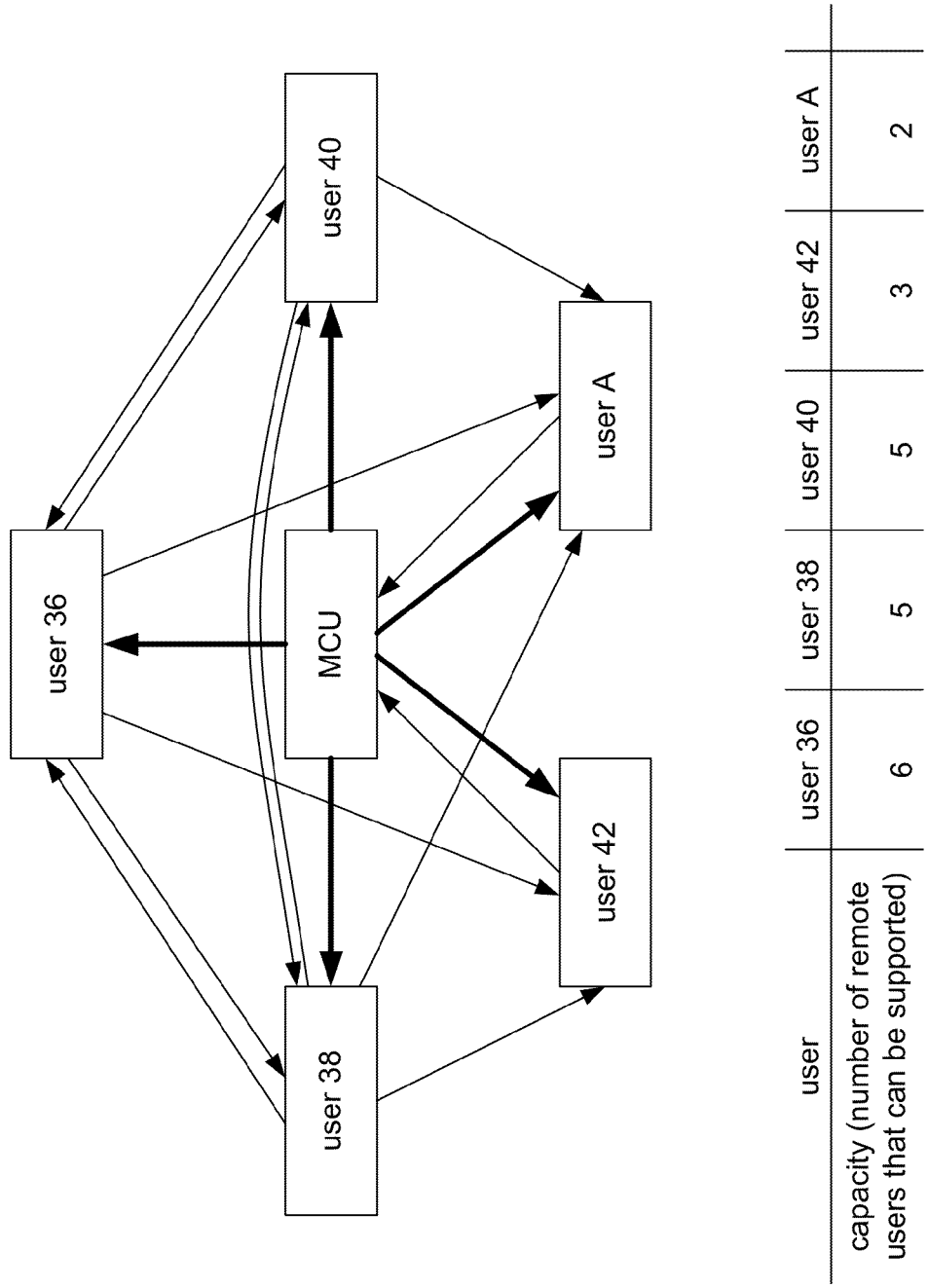
FIG. 5 diagrammatically depicts an video distribution architecture arrangement provided by the quality of experience process of FIG. 1, according to an example embodiment.

Consistent with the example shown in FIG. 5, different participants in the video conference may implement different video distribution architectures. For example, users 36, 38, and 40 may have a sufficient capacity to implement a distributed architecture, e.g., which may provide a relatively higher quality of experience. User 42 and user A may have an insufficient capacity to implement a distributed architecture, and may, therefore, implement a centralized architecture. The centralized architecture implemented by user 42 and user A may result in a relatively lower quality of experience associated with the video provided by user 42 and user A, but may enable user 42 and user A to participate in the video conference.

Additionally, quality of experience process 10 may implement 104 a video distribution architecture for user A based upon, at least in part, determining 100 a capacity of user A to support two remote users, and determining 102 that the video conference includes four remote users. Based upon, at least in part, user A having a capacity to support two remote users, which is less than the four remote participants engaged in the video conference, quality of experience process 10 may implement 108 a centralized architecture session with respect to user A. Consistent with the implemented 108 centralized architecture session, user A may transmit a video bit stream to the MCU, which may distribute the video bit stream from user A to the other participants of the video conference. In the illustrated example in which user 42 may also utilize a centralized video distribution architecture, in some embodiments the MCU may mix the video stream received from user 42 with the video stream received from user A, and may transmit the mixed video stream to the participants of the video conference, as generally shown by bold arrows in FIG. 5.

As described above, implementing 104 the video distribution architecture for the participant may be in response to a change in the number of remote participants of the video conference. In some situations, the change in the number of remote participants may include one of the remote participants leaving the video conference. For example, and referring also to FIG. 6, in an example embodiment, at some point during the video conference a participant (e.g., user A) may leave the video conference. User A leaving the video conference may result in the video conference including a total of four participants. Consistent with the example of FIG. 6, the video conference, including four total participants, may include three remote participants relative to user 42. Continuing with the example situation in which user 42 may have a capacity to support three remote users, the capacity of user 42 may be greater than or equal to the number of remote participants in the video conference. In some embodiments, quality of experience process 10 may determine 100 (and/or re-determine) the capacity of user 42.

Figure 6:
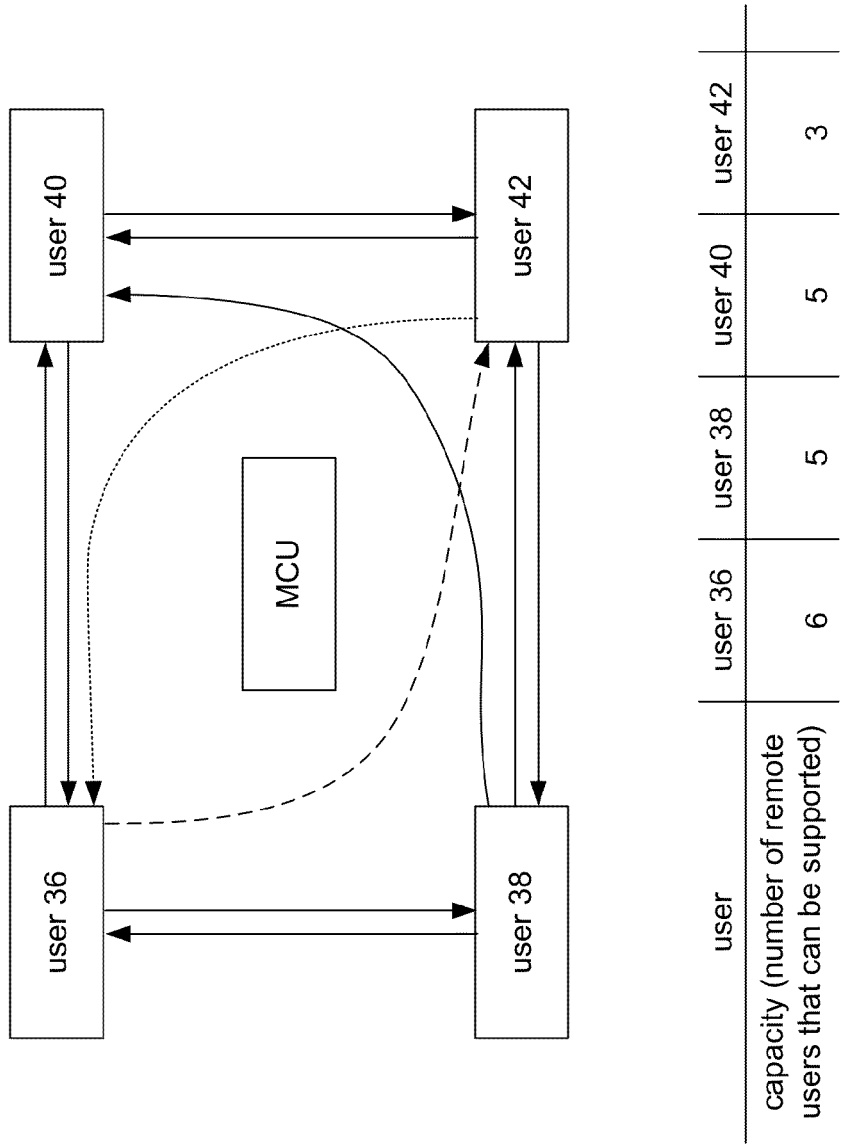
FIG. 6 diagrammatically depicts an video distribution architecture arrangement provided by the quality of experience process of FIG. 1, according to an example embodiment.

Based upon, at least in part, the change in the number of remote participants, quality of experience process 10 may implement 104 the video distribution architecture for user 42 including changing 112 the video distribution architecture for user 42. For example, as described with respect to FIG. 5, prior to user A leaving the video conference, user 42 may have utilized a centralized video distribution architecture based upon, at least in part, user 42 having a capacity less than the number of remote participants of the video conference. Based upon, at least in part, user 42 now having a capacity greater than or equal to the number of remote participants of the video conference, quality of experience process 10 may implement 104 a video distribution architecture for user 42 including implementing 106 a distributed architecture session. As shown in the example of FIG. 6, consistent with the distributed architecture session, user 42 may transmit a video bit stream to each of the remote participants of the video conference (e.g., to each of user 36, user 38, and user 40). Accordingly, quality of experience process 10 may adaptively select a video distribution architecture for user 42 based upon, at least in part, user 42's current capacity and the current number of remote participants of the video conference.

Figure 7:
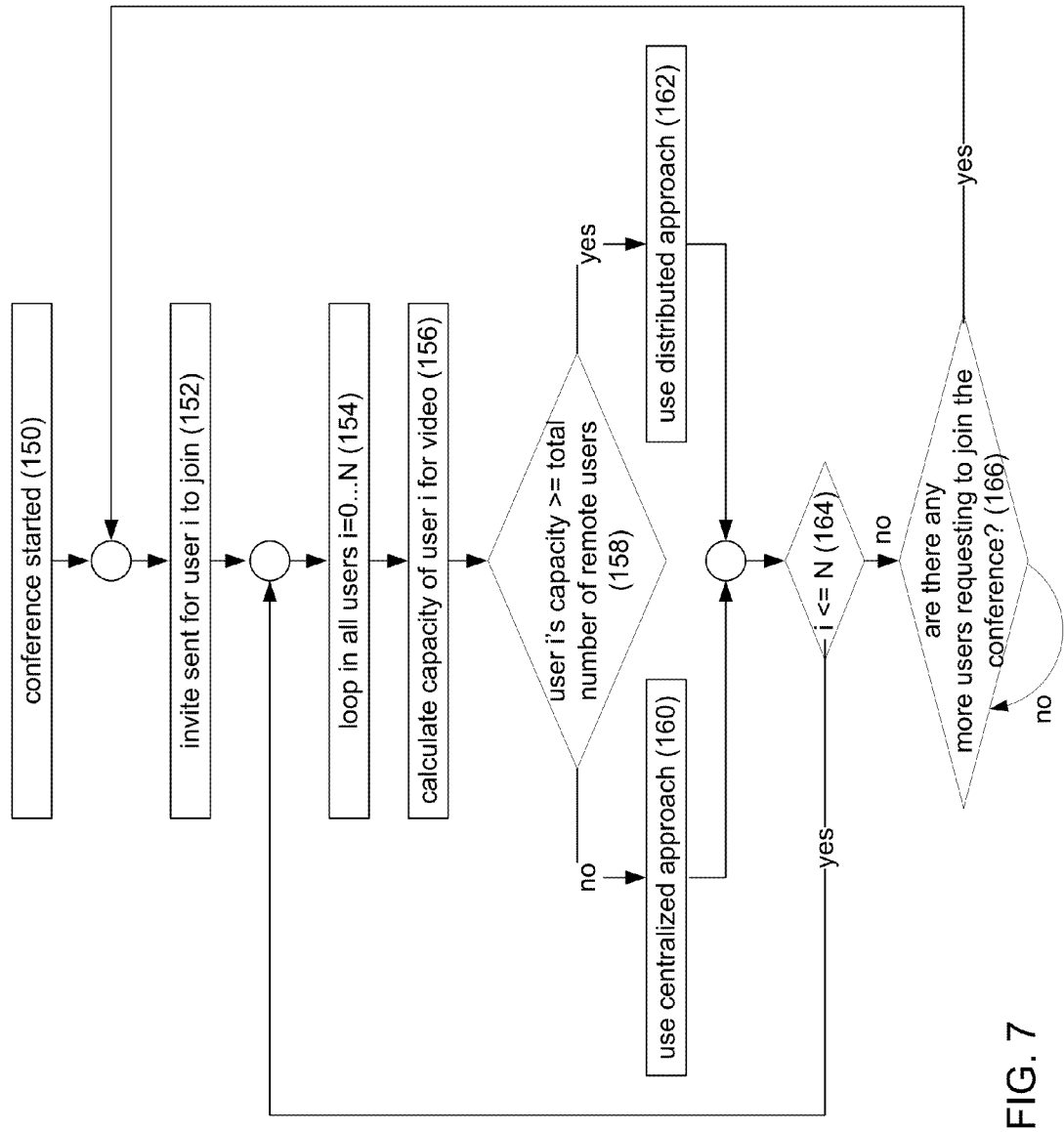
FIG. 7 is a flow chart of a process that may be implemented by the quality of experience process of FIG. 1, according to an example embodiment, and FIG. 8 diagrammatically depicts a computing device that may execute, in whole or in part, the quality of experience process of FIG. 1, according to an example embodiment.

Referring also to FIG. 7, and as generally discussed herein, a video conference may be started at block 150. An invitation may be sent to a user (e.g., user i) to join the conference at block 152. All of the users currently invited to the conference may be looped in at block 154. A capacity associated with user i for video transmission for the video conference may be calculated at block 156. It may be determined whether user i has a capacity that is greater than or equal to the number or remote users at block 158. If user i does not have a capacity greater than or equal to the total number or remote users, a centralized video distribution architecture may be implemented at block 160. If user i does have a capacity greater than or equal to the total number of remote user, a distributed architecture may be implemented at block 162. It may be determined, at block 158, if there are any additional invited users to join the conference. If there are additional invited users to join the conference, the additional user may be looped into the conference, and the capacities of the users participating in the conference may be evaluated, as generally described above. It may be determined if there are any more user requesting to join the conference (or whose participation may be desired) at block 166. If additional users are desired, invitations may be sent to the users, and the process may generally proceed as described above. If no additional users are requested, the process may periodically and/or continuously evaluate whether any additional users are requesting to join the conference.

Figure 8:
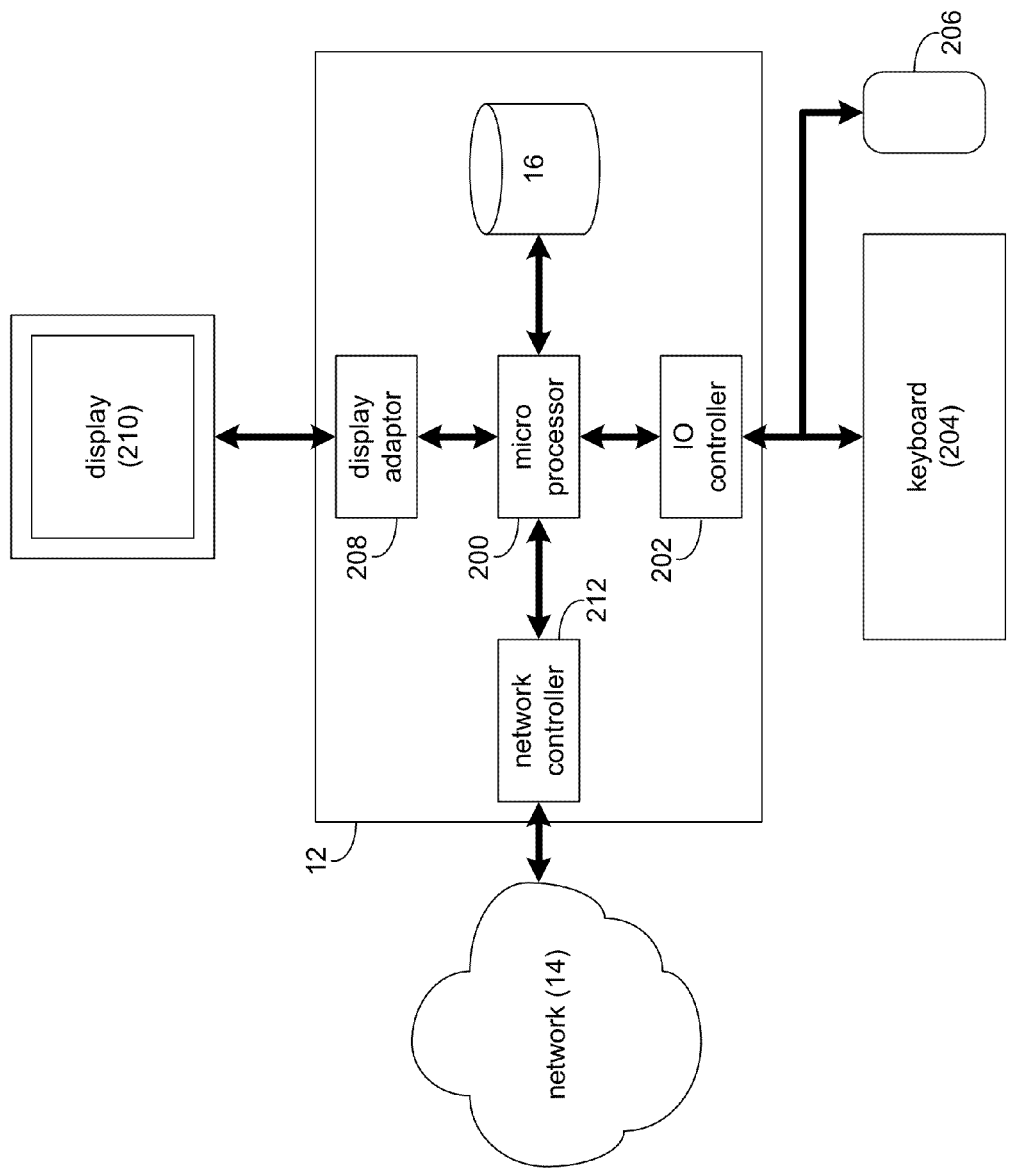

Referring also to FIG. 8, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of experience process 10 may be substituted for computing device 12 within FIG. 8, examples of which may include but are not limited to client electronic devices 28, 30, 32, 34.

Computing system 12 may include microprocessor 200 configured to e.g., process data and execute instructions/code for quality of experience process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a non-transitory computer readable storage medium having a plurality of instructions stored thereon, which, when executed by a processor, cause the processor to perform operations including:
   determining a capacity of a participant associated with a video conference, wherein determining the capacity of the participant is in response to identifying a change in network conditions associated with the participant, wherein the change in network conditions modifies an uplink bandwidth available to the participant;
   determining a number of remote participants of the video conference; and
   implementing a video distribution architecture for the participant based upon, at least in part, the capacity of the participant and the number of remote participants including:
      implementing a distributed architecture session for the participant if the capacity of the participant is greater than or equal to the number of remote participants of the video conference, and
      implementing a centralized architecture session for the participant if the capacity of the participant is less than the number of remote participants of the video conference.

2. The computer program product of claim 1, wherein implementing the video distribution architecture for the participant is in response to the participant joining the video conference.

3. The computer program product of claim 1, wherein implementing the video distribution architecture for the participant is in response to a change in the number of remote participants of the video conference.

4. The computer program product of claim 3, wherein implementing the video distribution architecture for the participant including changing the video distribution architecture for the participant.

5. The computer program product of claim 4, wherein the change in the number of remote participants includes an additional remote participant joining the video conference.

6. The computer program product of claim 4, wherein the change in the number of remote participants includes one of the remote participants leaving the video conference.

7. A computing system comprising:
   a processor and a memory module coupled with the processor, the processor being configured for:
   determining a capacity of a participant associated with a video conference, wherein determining the capacity of the participant is in response to identifying a change in network conditions associated with the participant, wherein the change in network conditions modifies an uplink bandwidth available to the participant;
   determining a number of remote participants of the video conference; and
   implementing a video distribution architecture for the participant based upon, at least in part, the capacity of the participant and the number of remote participants including:
      implementing a distributed architecture session for the participant if the capacity of the participant is greater than or equal to the number of remote participants of the video conference, and
      implementing a centralized architecture session for the participant if the capacity of the participant is less than the number of remote participants of the video conference.

8. The computing system of claim 7, wherein implementing the video distribution architecture for the participant is in response to the participant joining the video conference.

9. The computing system of claim 7, wherein implementing the video distribution architecture for the participant is in response to a change in the number of remote participants of the video conference.

10. The computing system of claim 9, wherein the change in the number of remote participants includes an additional remote participant joining the video conference.

11. The computing system of claim 9, wherein the change in the number of remote participants includes one of the remote participants leaving the video conference.

* * * * *